US012734552B2

(12) United States Patent
Ahn et al.

(10) Patent No.: US 12,734,552 B2
(45) Date of Patent: Sep. 15, 2026

(54) METHOD AND SYSTEM FOR INSPECTING AND SEPARATING BATTERY

(71) Applicant: LG ENERGY SOLUTION, LTD., Seoul (KR)

(72) Inventors: Chan Soo Ahn, Daejeon (KR); Yeong Kyun Ko, Daejeon (KR); Young Ho Jung, Daejeon (KR); Si Won Jeon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 250 days.

(21) Appl. No.: 18/694,580

(22) PCT Filed: Jan. 10, 2023

(86) PCT No.: PCT/KR2023/000452
§ 371 (c)(1),
(2) Date: Mar. 22, 2024

(87) PCT Pub. No.: WO2023/132741
PCT Pub. Date: Jul. 13, 2023

(65) Prior Publication Data

US 2024/0390949 A1 Nov. 28, 2024

(30) Foreign Application Priority Data

Jan. 10, 2022 (KR) ........................ 10-2022-0003646

(51) Int. Cl.
*B07C 5/344* (2006.01)
*H01M 10/42* (2006.01)
*H01M 10/48* (2006.01)

(52) U.S. Cl.
CPC ......... *B07C 5/344* (2013.01); *H01M 10/4285* (2013.01); *H01M 10/482* (2013.01)

(58) Field of Classification Search
CPC .. B07C 5/344; H01M 10/4285; H01M 10/482
(Continued)

(56) References Cited

U.S. PATENT DOCUMENTS 6,480,002 B1 11/2002 Jung et al.
6,781,344 B1 * 8/2004 Hedegor ............ G01R 31/3865 209/575

(Continued)

FOREIGN PATENT DOCUMENTS

CN 104868184 B 4/2017
CN 109585949 B 8/2020
(Continued)

OTHER PUBLICATIONS

Extended European Search Report for European Application No. 23737489.7, dated Jun. 5, 2025.

(Continued)

*Primary Examiner* — Giovanni Astacio-Oquendo
*Assistant Examiner* — Trung Q Nguyen
(74) *Attorney, Agent, or Firm* — Birch, Stewart, Kolasch & Birch, LLP

(57) ABSTRACT

Discussed is a method for inspecting and separating batteries, the method including: determining which of a predetermined number of the batteries is a good battery, when not all of the predetermined number of the batteries are determined to be good batteries, receiving another good battery temporarily stored in a good battery storage by a transfer when it is possible to form a good battery group including only good batteries by receiving the another good battery temporarily stored in the good battery storage by the transfer, and temporarily storing the good battery among the predetermined number of the batteries by transferring the good battery to the good battery storage when it is not possible to form the good battery group including only good batteries (Continued)

even by receiving the another good battery temporarily stored in the good battery storage by the transfer.

16 Claims, 11 Drawing Sheets

(58) Field of Classification Search
USPC ...................... 324/500, 600, 76.11, 415–433
See application file for complete search history.

(56) References Cited

U.S. PATENT DOCUMENTS

| | | | | |
|---|---|---|---|---|
| 11,034,257 | B2 * | 6/2021 | Seeman | B60L 58/12 |
| 2002/0166802 | A1 | 11/2002 | Jung et al. | |
| 2003/0209375 | A1 | 11/2003 | Suzuki et al. | |
| 2011/0234232 | A1 * | 9/2011 | Ro | B07C 5/344 429/93 |
| 2012/0028375 | A1 | 2/2012 | Sato et al. | |
| 2018/0306867 | A1 | 10/2018 | Bertness | |
| 2019/0245251 | A1 | 8/2019 | Park et al. | |
| 2021/0141021 | A1 | 5/2021 | Salo, III et al. | |
| 2021/0234145 | A1 | 7/2021 | Chung | |
| 2022/0349948 | A1 * | 11/2022 | Kowalski | B60L 3/0046 |
| 2022/0384858 | A1 * | 12/2022 | Bertness | G01R 31/396 |
| 2023/0160967 | A1 | 5/2023 | Huh et al. | |
| 2023/0327178 | A1 * | 10/2023 | Taylor | G01R 31/387 320/134 |
| 2024/0283039 | A1 * | 8/2024 | Hwang | G01R 31/367 |
| 2025/0189591 | A1 * | 6/2025 | Kim | G01R 31/396 |

FOREIGN PATENT DOCUMENTS

| | | | |
|---|---|---|---|
| JP | 2002-233064 | A | 8/2002 |
| JP | 2012-28686 | A | 2/2012 |
| JP | 6070989 | B2 | 2/2017 |
| JP | 2020-42951 | A | 3/2020 |
| KR | 10-1997-0030998 | A | 6/1997 |
| KR | 1998-040965 | A | 8/1998 |
| KR | 2002-0085266 | A | 11/2002 |
| KR | 10-2005-0072354 | A | 7/2005 |
| KR | 10-2015-0137583 | A | 12/2015 |
| KR | 10-2019-0089369 | A | 7/2019 |
| KR | 10-2019-0094829 | A | 8/2019 |
| KR | 10-2020-0026144 | A | 3/2020 |
| KR | 10-2146945 | B1 | 8/2020 |
| KR | 10-2253385 | B1 | 5/2021 |
| KR | 10-2021-0083921 | A | 7/2021 |
| KR | 10-2021-0143462 | A | 11/2021 |
| KR | 10-2345882 | B1 | 1/2022 |

OTHER PUBLICATIONS

International Search Report issued in PCT/KR2023/000452 (PCT/ISA/210), mailed on Apr. 19, 2023.

* cited by examiner

METHOD AND SYSTEM FOR INSPECTING AND SEPARATING BATTERY

CROSS-REFERENCE TO RELATED APPLICATIONS

This application claims the benefit of Korean Patent Application No. 10-2022-0003646, filed on Jan. 10, 2022, in the Korean Intellectual Property Office, the disclosure of which is incorporated herein in its entirety by reference.

TECHNICAL FIELD

The present disclosure relates to a method and system for inspecting a battery to determine whether the battery is good (e.g., non-defective), and separating the battery depending on whether the battery is good (e.g., non-defective).

BACKGROUND ART

Due to issues such as environmental pollution and oil depletion, development of power generation based on eco-friendly energy resources such as solar heat, hydroelectric power, wind power, ocean energy, and biomass energy is in progress. In particular, research on secondary batteries capable of being repeatedly charged is being actively conducted, and aspects such as materials, efficiency, structure, stability, and systems of secondary batteries are being developed.

During their production, secondary batteries go through processes, where various processes corresponding to the type of secondary batteries are applied. In general, secondary batteries are produced through processes such as an electrode process, an assembly process, and a formation process, and during the production of secondary batteries, there is also a process of inspecting the secondary batteries to determine whether the secondary batteries are good (e.g., non-defective) and separating defective batteries.

According to the related art, during the production of secondary batteries, the inspection on the secondary batteries performed as to whether the secondary batteries are good, and if there is a defective battery, a good battery and the defective battery are discharged together, the defective battery is separated through an extra operation, and then the good battery is put back in.

DISCLOSURE OF THE INVENTION

Technical Problem

An aspect of the present disclosure provides a method and system capable of, for batteries determined to be good or defective through inspection, automatically transporting and keeping defective batteries and automatically transporting and temporarily storing good batteries, and automatically discharging a predetermined number of good batteries for the next process when certain requirements are met.

Technical Solution

According to an aspect of the present disclosure, there is provided a method for inspecting and separating batteries, the method including: determining which of a predetermined number of the batteries is a good battery; when not all of the predetermined number of the batteries are determined to be good batteries, receiving another good battery temporarily stored in a good battery storage by transfer, when it is possible to form a good battery group including only good batteries by receiving the another good battery temporarily stored in the good battery storage by transfer, and temporarily storing the good battery among the predetermined number of the batteries by transferring the good battery to the good battery storage, when it is not possible to form the good battery group including only good batteries even by receiving the another good battery temporarily stored in the good battery storage by the transfer; and discharging the good battery group when the good battery group is formed.

The method for inspecting and separating the batteries may further include discharging all of the predetermined number of the batteries when all of the predetermined number of the batteries are determined to be good batteries.

The method for inspecting and separating the batteries may further include transferring a defective battery determined not to be a good battery among the predetermined number of the batteries to a defective battery storage for storage of the defective battery.

The determining of which of the predetermined number of the batteries is a good battery may include determining thereof based on at least one of a voltage test, a current test, and a resistance test for the predetermined number of the batteries.

The good battery group may include a same number of good batteries as the predetermined number of the batteries.

The method for inspecting and separating the batteries may further include, prior to the determining of which of the predetermined number of the batteries is a good battery, sequentially receiving battery groups each including the predetermined number of the batteries.

The transfer may be performed by using a suction pad.

The method for inspecting and separating the plurality of batteries may further include discharging all of the predetermined number of the batteries or the good battery group to a battery operator to perform a predetermined operation.

According to an aspect of the present disclosure, there is provided a system for inspecting and separating batteries, the system including: a battery inspector that determines which of a predetermined number of the batteries is a good battery; a battery separator that separates and discharges the predetermined number of the batteries; a good battery storage in which good batteries are temporarily stored; and a controller electrically connected to the battery inspector and the battery separator, and the controller controls the battery inspector to determine which of the predetermined number of the batteries is a good battery, and controls the battery separator to: when not all of the predetermined number of the batteries are determined to be good batteries, receive another good battery temporarily stored in the good battery storage by a transfer, when it is possible to form a good battery group by receiving the another good battery temporarily stored in the good battery storage by the transfer; and temporarily store a good battery among the predetermined number of the batteries by transferring the good battery to the good battery storage unit, when it is not possible to form the good battery group including only good batteries even by receiving the another good battery temporarily stored in the good battery storage by the transfer; and discharge the good battery group when the good battery group is formed.

The system for inspecting and separating the batteries may further include a defective battery storage that stores a defective battery, and the controller may control the battery separator to transfer the defective battery determined not to be a good battery among the predetermined number of the batteries to the defective battery storage.

The controller may control the battery inspector to determine which of the predetermined number of the batteries is a good battery based on at least one of a voltage test, a current test, and a resistance test for the predetermined number of the batteries.

The good battery group may include a same number of good batteries as the predetermined number of the batteries.

The battery separator may transfer the good battery using a suction pad.

The system for inspecting and separating the batteries may further include a battery supplier that sequentially supplies battery groups each including the predetermined number of the batteries to the battery inspector.

The system for inspecting and separating the batteries may further include a battery operator that performs a predetermined operation on the discharged all of the predetermined number of the batteries, or the discharged good battery group.

The control unit may control the battery separator to, when all of the predetermined number of the batteries are determined to be good batteries, discharge all of the predetermined number of the batteries.

Advantageous Effects

According to a preferred embodiment of the present disclosure, a process is not performed in which a good battery and a defective battery are discharged together, the defective battery and the good battery are separated from each other, and then the good battery is put in back, and thus an unnecessary manual task may be omitted.

According to a preferred embodiment of the present disclosure, with the inspection and separation system for the batteries being automated and a task manually performed being omitted, the inspection and separation process may be efficiently and simply performed.

MODE FOR CARRYING OUT THE INVENTION

Figure 1:
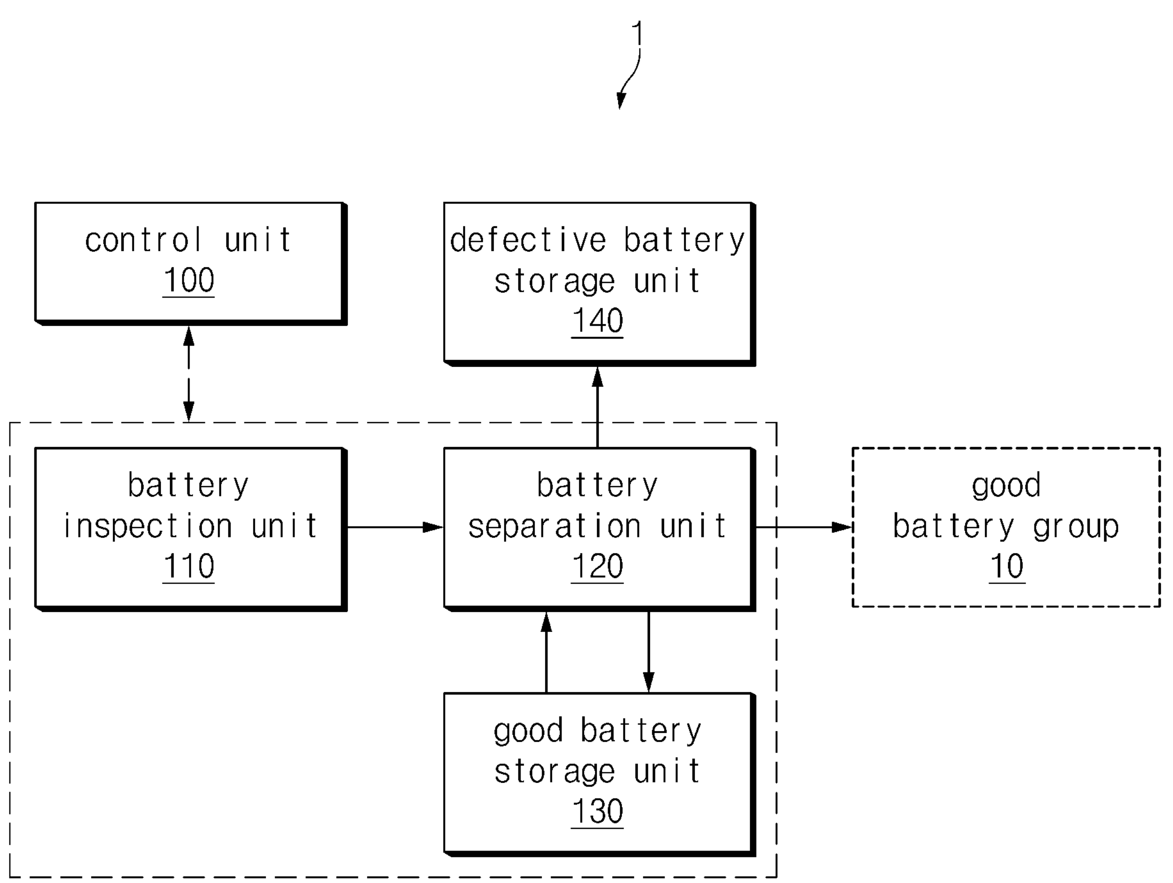
FIG. 1 is a diagram showing an inspection-separation system for secondary batteries according to an embodiment of the present disclosure.

Hereinafter, preferred embodiments of the present disclosure will be described in detail with reference to the accompanying drawings so that those skilled in the art may easily carry out the present disclosure. However, the present disclosure may be implemented in various different forms and is neither limited nor restricted by the following embodiments.

In order to clearly illustrate the present disclosure, detailed descriptions of parts not related to the description or techniques known in the art that may unnecessarily obscure the subject matter of the present disclosure are omitted, and in the specification, when reference numerals are given to components in each of the drawings, the same or similar components will be designated by the same or similar reference numerals through the specification.

In addition, terms or words used in this specification and claims should not be restrictively interpreted as ordinary meanings or dictionary-based meanings, but should be interpreted as meanings and concepts conforming to the scope of the present disclosure on the basis of the principle that an inventor can properly define the concept of a term to describe and explain his or her invention in the best ways.

FIG. 1 illustrates an inspection-separation system 1 of a secondary battery according to an embodiment of the present disclosure (hereinafter, an "inspection-separation system 1").

The inspection-separation system 1 may include a battery inspection unit 110. The battery inspection unit 110 may perform an inspection to determine which of batteries supplied to the inspection-separation system 1 is a good battery. For example, the battery inspection unit 110 may determine which of sequentially supplied batteries is a good battery based on at least one of a voltage test, a current test, and a resistance test for the batteries. Accordingly, a good battery (e.g., a non-defective battery) may refer to a battery having a performance or a measurement value that is at or greater than at least one of a predetermined voltage, a predetermined current and a predetermined resistance, or other criteria or characteristics, or combinations thereof. Meanwhile, a defective battery may refer to a battery having a performance or a measurement value that is less than at least one of the predetermined voltage, the predetermined current and the predetermined resistance, or other criteria or characteristics, or combinations thereof.

The battery inspection unit 110 may sequentially receive battery groups each including a predetermined number of batteries for inspection. For example, battery groups including a predetermined number of batteries may be sequentially supplied to the battery inspection unit 110, and the battery inspection unit 110 may determine which of a predetermined number of batteries included in each of the sequentially supplied battery groups is a good battery.

The inspection-separation system 1 may include a battery separation unit 120. The battery separation unit 120 may perform a separation operation on batteries that have been determined to be good batteries or defective batteries. For example, the battery separation unit 120 may transfer batteries determined to be good batteries to a good battery storage unit 130 and may transfer batteries that are not determined to be good batteries to a defective battery storage unit 140. The battery separation unit 120 may suck or use suction on the batteries using a suction pad, and transfer the sucked or suctioned batteries to one of the good battery storage unit 130 and the defective battery storage unit 140, but other means or devices to transfer batteries may be used, including a grabber or a holder.

The inspection-separation system 1 may include the good battery storage unit 130. The good battery storage unit 130 may store batteries determined to be good batteries (or non-defective batteries). For example, good batteries may be temporarily stored in the good battery storage unit 130 prior to discharging the good batteries from the inspection-separation system 1.

The inspection-separation system 1 may include the defective battery storage unit 140. The defective battery storage unit 140 may store batteries that are not determined to be good batteries (i.e., determined to be defective batteries). For example, defective batteries that are not to be discharged as good batteries from the inspection-separation system 1 may be stored in the defective battery storage unit 140.

The inspection-separation system 1 may further include a control unit 100. The control unit 100 may be electrically connected to at least one of the battery inspection unit 110 and the battery separation unit 120, and may control operations performed by at least one of the battery inspection unit 110 and the battery separation unit 120.

The inspection-separation system 1 may discharge a good battery group 10. For example, the good battery group 10 may be a battery group including only good batteries. When discharging good batteries, the inspection-separation system 1 may discharge good batteries after forming the good battery group 10 including only a predetermined number of good batteries for process efficiency. The predetermined number of good batteries included in the good battery group 10 may be the same as the predetermined number of batteries included in each of the battery groups sequentially supplied to the battery inspection unit 110. However, the number need not be limited thereto.

Figure 2:
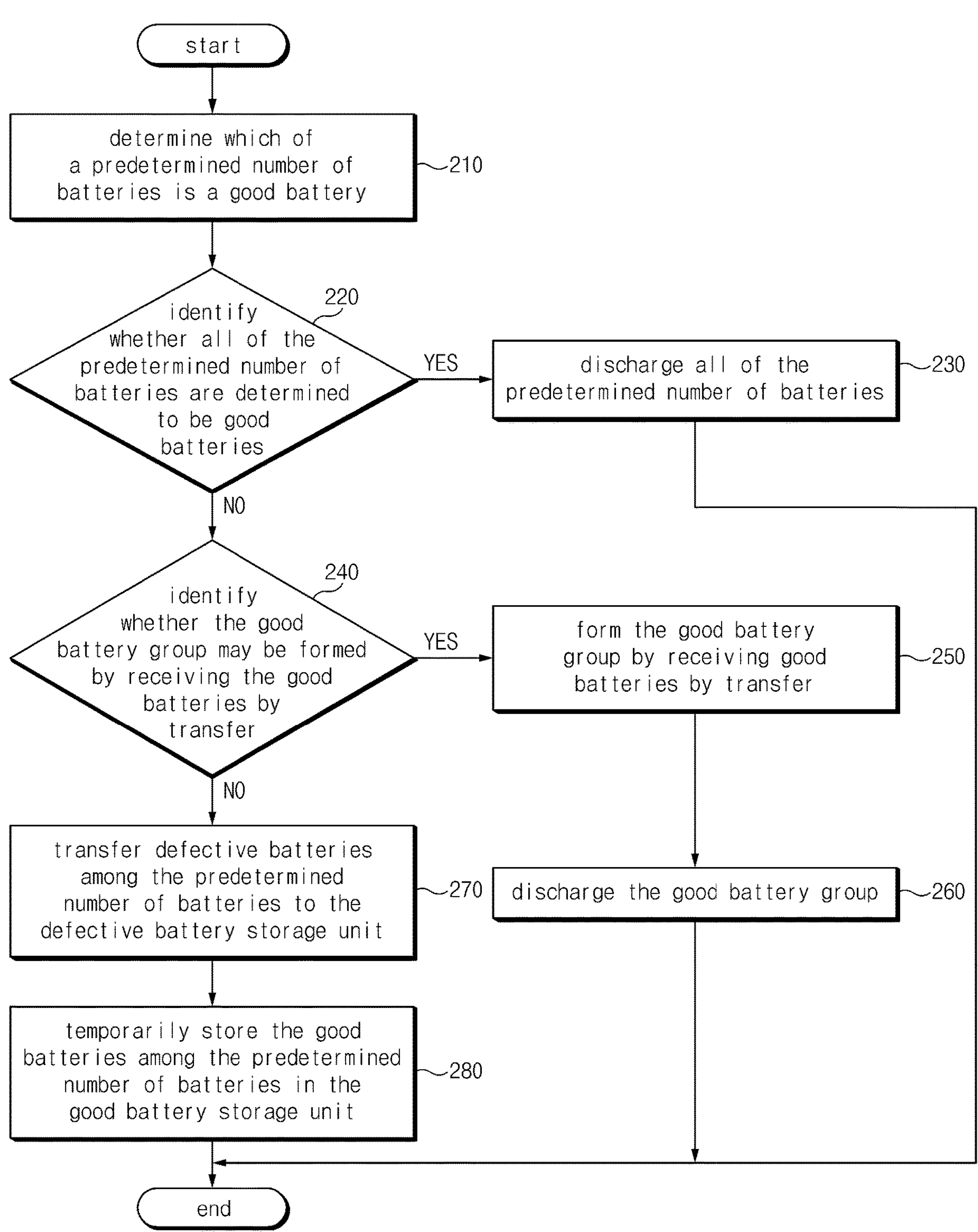
FIG. 2 is a flowchart illustrating a procedure for inspecting and separating secondary batteries according to an embodiment of the present disclosure.

FIG. 2 is a flowchart illustrating a procedure for inspecting and separating secondary batteries according to an embodiment of the present disclosure.

According to step 210, it is possible to determine which of a predetermined number of batteries is a good battery. For example, the battery inspection unit 110 may determine which of a predetermined number of batteries is a good battery. The battery inspection unit 110 may determine which of the batteries is a good battery based on at least one of a voltage test, a current test, and a resistance test for the batteries. For a specific example, when the number of batteries included in each of the battery groups sequentially supplied to the battery inspection unit 110 is four, the battery inspection unit 110 may determine which of the four batteries is a good battery.

According to step 220, it is possible to identify whether all of the predetermined number of batteries are determined to be good batteries. For example, the battery separation unit 120 may identify whether all of the predetermined number of batteries are determined to be good batteries. The battery separation unit 120 may perform step 230 when it is identified that all of the predetermined number of batteries are determined to be good batteries.

According to step 230, it is possible to discharge all of the predetermined number of batteries. For example, when it is identified that all of the predetermined number of batteries are determined to be good batteries (Yes in step 230), the battery separation unit 120 may discharge all of the predetermined number of batteries as the good battery group 10. For a specific example, when it is identified that four batteries are inspected to determine which of them is a good battery and all the four batteries are determined to be good batteries, the battery separation unit 120 may discharge the four batteries as the good battery group 10.

The battery separation unit 120 may perform step 240 when it is identified in step 230 that not all of the predetermined number of batteries are determined to be good batteries (No in step 230).

According to step 240, it is possible to identify whether the good battery group 10 may be formed by receiving the good batteries by transfer. For example, the battery separation unit 120 may identify whether the formation of the good battery group 10 is possible (Yes in step 240), by transferring, to the defective battery storage unit 140, defective batteries from among the predetermined number of batteries and receiving the good batteries from the good battery storage unit 130 by transfer. For a specific example, when the number of good batteries stored in the good battery storage unit 130 is insufficient to form the good battery group 10, the battery separation unit 120 may identify that the formation of the good battery group 10 is not possible (No in step 240). For another example, when the number of good batteries stored in the good battery storage unit 130 is smaller than the number of defective batteries transferred to the defective battery storage unit 140, the battery separation unit 120 may identify that the formation of the good battery group 10 is not possible (No in step 240).

When the number of good batteries stored in the good battery storage unit 130 is not insufficient to form the good battery group 10, the battery separation unit 120 may identify that the formation of the good battery group 10 is possible. In addition, when the number of good batteries stored in the good battery storage unit 130 is equal to or greater than the number of defective batteries transferred to the defective battery storage unit 140, the battery separation unit 120 may identify that the formation of the good battery group 10 is possible.

When it is identified that the formation of the good battery group 10 is possible, the battery separation unit 120 may perform step 250.

According to step 250, it is possible to form the good battery group 10 by receiving good batteries by transfer. For example, the battery separation unit 120 may receive good batteries stored in the good battery storage unit 130 by transfer, and may form the good battery group 10 including a predetermined number of good batteries by receiving the good batteries by transfer.

According to step 260, it is possible to discharge the good battery group 10. For example, when the good battery group 10 is formed, the battery separation unit 120 may discharge the good battery group 10 from the inspection-separation system 1 for another process.

When it is identified that the formation of the good battery group 10 is not possible (No in step 240), the battery separation unit 120 may perform step 270.

According to step 270, defective batteries among the predetermined number of batteries may be transferred to the defective battery storage unit 140. For example, when the number of good batteries stored in the good battery storage unit 130 is insufficient to form the good battery group 10, the battery separation unit 120 may identify that the formation of the good battery group 10 is not possible. When it is identified that the formation of the good battery group 10 is not possible, the battery separation unit 120 may transfer defective batteries among the predetermined number of supplied batteries to the defective battery storage unit 140.

According to step 280, it is possible to temporarily store the good batteries among a predetermined number of batteries in the good battery storage unit 130. For example, when it is identified that the formation of the good battery group 10 is not possible, the battery separation unit 120 may temporarily store good batteries among a predetermined number of supplied batteries in the good battery storage unit 130.

The control unit 100 of the inspection-separation system 1 may perform the operations of steps 210 to 280 described above by controlling at least one of the battery inspection unit 110 and the battery separation unit 120.

Hereinafter, with reference to the embodiments of FIGS. 3 to 10, a procedure for inspecting and separating the secondary batteries by the inspection-separation system 1 will be described in detail. In addition, the embodiments of FIGS. 3 to 10 will be described on the premise that the predetermined number is four, but this is an example for convenience of description and is not particularly limited thereto. Since battery groups are sequentially supplied, each embodiment may be described on the premise of the previous embodiment. For example, after the Nth embodiment, the N+1th embodiment may be performed on the premise of the Nth embodiment.

Figure 3:
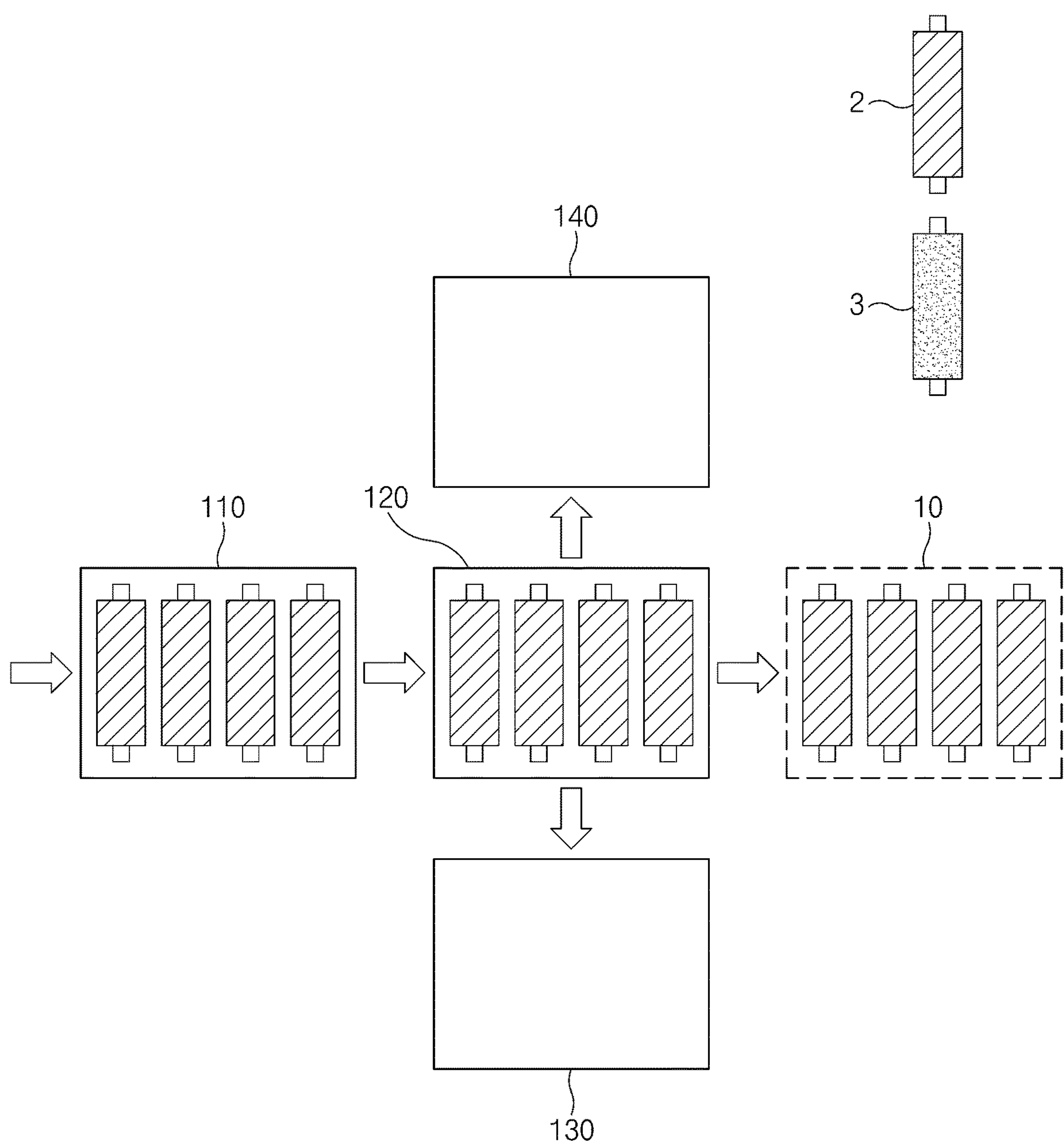
FIG. 3 is a diagram showing inspection and separation of secondary batteries according to a first embodiment of the present disclosure.

FIG. 3 shows inspection and separation of secondary batteries according to a first embodiment of the present disclosure.

The battery inspection unit 110 may receive a battery group including four batteries. The battery inspection unit 110 may perform an inspection to determine which battery of the supplied battery group is a good battery. The battery inspection unit 110 may determine which battery of the supplied battery group is a good battery based on at least one of a voltage test, a current test, and a resistance test for each battery included in the battery group.

When all four batteries included in the supplied battery group are good batteries 2, the battery inspection unit 110 may determine that all of the batteries included in the supplied battery group are good batteries 2. For example, when it is identified that all of the batteries included in the supplied battery group are determined to be good batteries 2, the battery separation unit 120 may discharge all of the four batteries as the good battery group 10.

In this case, no battery may exist in each of the good battery storage unit 130 and the defective battery storage unit 140.

Figure 4:
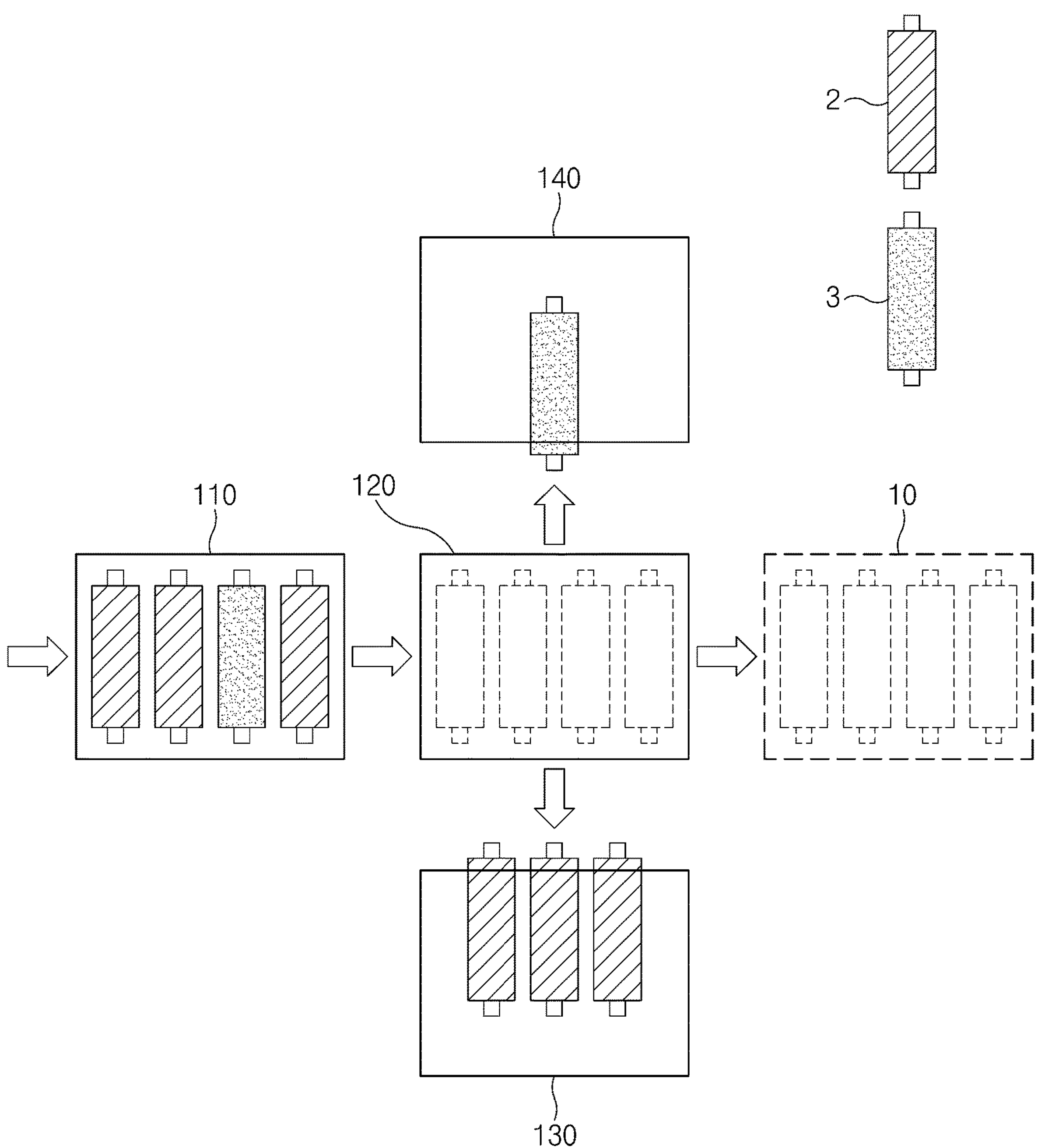
FIG. 4 is a diagram showing inspection and separation of secondary batteries according to a second embodiment of the present disclosure.

FIG. 4 shows inspection and separation of secondary batteries according to a second embodiment of the present disclosure.

When there are three good batteries 2 and one defective battery 3 among the four batteries included in the supplied battery group, the battery inspection unit 110 may determine that, among the four batteries, there are three good batteries 2 and there is one defective battery 3.

When identifying the determination made, the battery separation unit 120 may identify whether it is possible to form the good battery group 10 by receiving a good battery 2 from the good battery storage unit 130 by transfer. In this case, since no good battery 2 exists in the good battery storage unit 130 according to the first embodiment, it may not be possible to form the good battery group 10 including four good batteries. The battery separation unit 120 may identify that formation of the good battery group 10 is not possible, transfer the one defective battery 3 to the defective battery storage unit 140, and transfer the three good batteries 2 to the good battery storage unit 130.

In this case, three good batteries 2 may exist in the good battery storage unit 130 and one defective battery 3 may exist in the defective battery storage unit 140.

Figure 5:
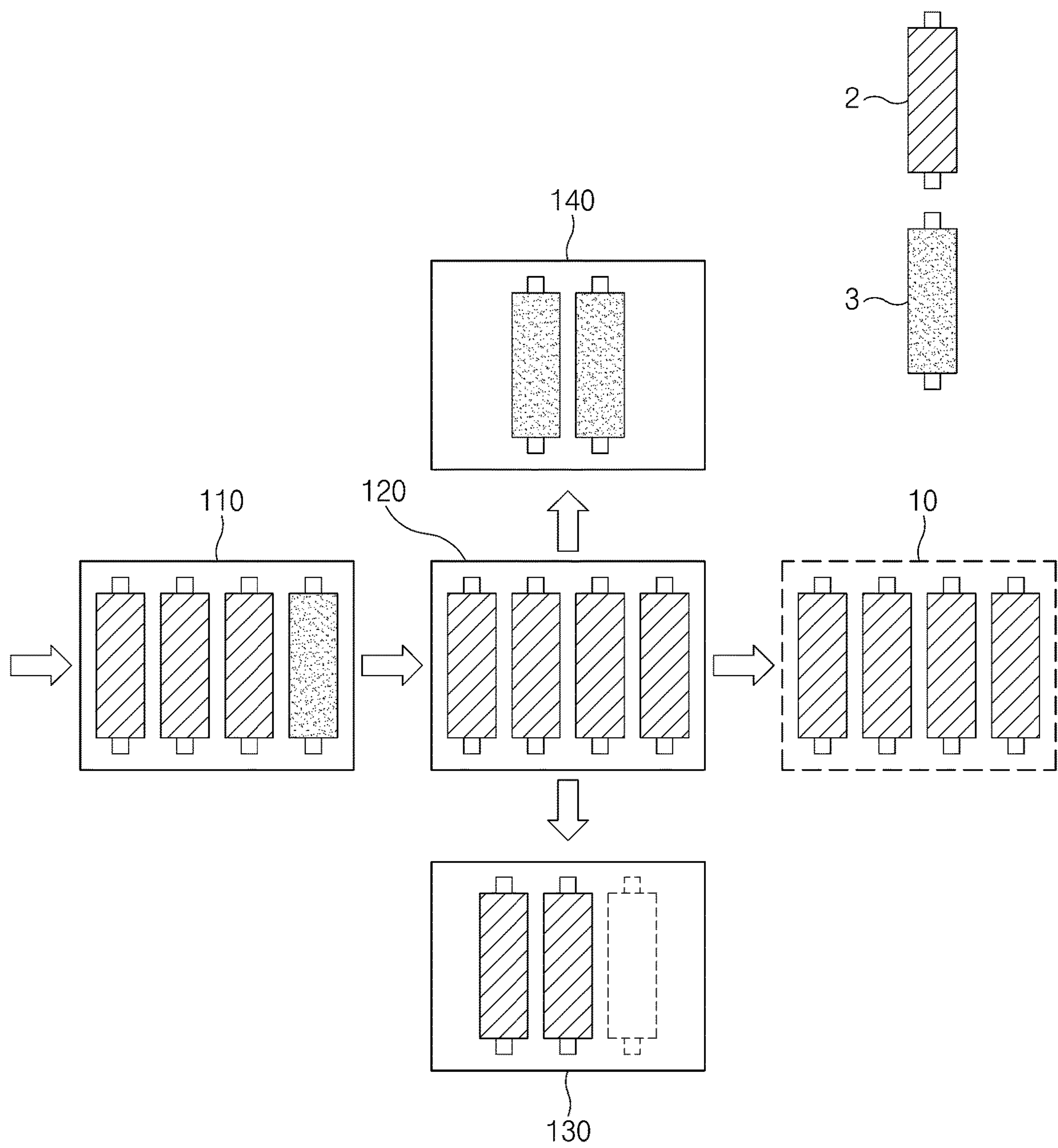
FIG. 5 is a diagram showing inspection and separation of secondary batteries according to a third embodiment of the present disclosure.

FIG. 5 shows inspection and separation of secondary batteries according to a third embodiment of the present disclosure.

When there are three good batteries 2 and one defective battery 3 among the four batteries included in the supplied battery group, the battery inspection unit 110 may determine that, among the four batteries, there are three good batteries 2 and there is one defective battery 3.

When identifying the determination made, the battery separation unit 120 may identify whether it is possible to form the good battery group 10 by receiving a good battery 2 from the good battery storage unit 130 by transfer. In this case, since three good batteries 2 exist in the good battery storage unit 130 according to the second embodiment, it may be possible to form the good battery group 10 including four good batteries by receiving one good battery 2 by transfer.

The battery separation unit 120 may identify that formation of the good battery group 10 is possible, transfer the one defective battery 3 to the defective battery storage unit 140, and form the good battery group 10 by receiving the one good battery 2 from the good battery storage unit 130 by transfer. The battery separation unit 120 may discharge the good battery group 10 including four good batteries.

In this case, two good batteries 2 may exist in the good battery storage unit 130 and two defective batteries 3 may exist in the defective battery storage unit 140.

Figure 6:
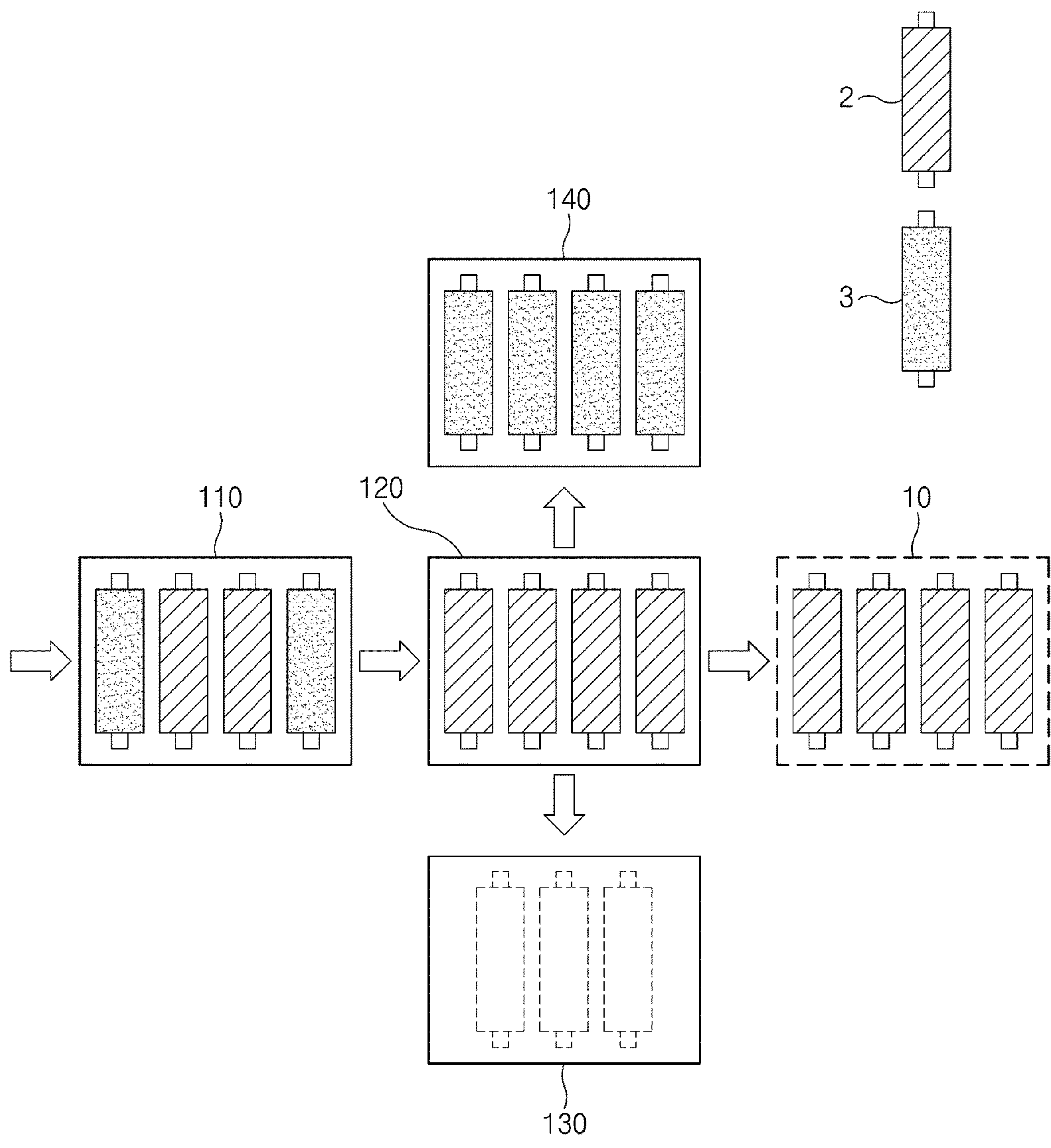
FIG. 6 is a diagram showing inspection and separation of secondary batteries according to a fourth embodiment of the present disclosure.

FIG. 6 shows inspection and separation of secondary batteries according to a fourth embodiment of the present disclosure.

When there are two good batteries 2 and two defective batteries 3 among the four batteries included in the supplied battery group, the battery inspection unit 110 may determine that, among the four batteries, there are two good batteries 2 and there are two defective batteries 3.

When identifying the determination made, the battery separation unit 120 may identify whether it is possible to form the good battery group 10 by receiving a good battery 2 from the good battery storage unit 130 by transfer. In this case, since two good batteries 2 exists in the good battery storage unit 130 according to the third embodiment, it may be possible to form the good battery group 10 including four good batteries by receiving two good batteries 2 by transfer.

The battery separation unit 120 may identify that formation of the good battery group 10 is possible, transfer the two defective batteries 3 to the defective battery storage unit 140, and form the good battery group 10 by receiving the two good batteries 2 from the good battery storage unit 130 by transfer. The battery separation unit 120 may discharge the good battery group 10 including four good batteries.

In this case, no good battery 2 may exist in the good battery storage unit 130 and four defective batteries 3 may exist in the defective battery storage unit 140.

Figure 7:
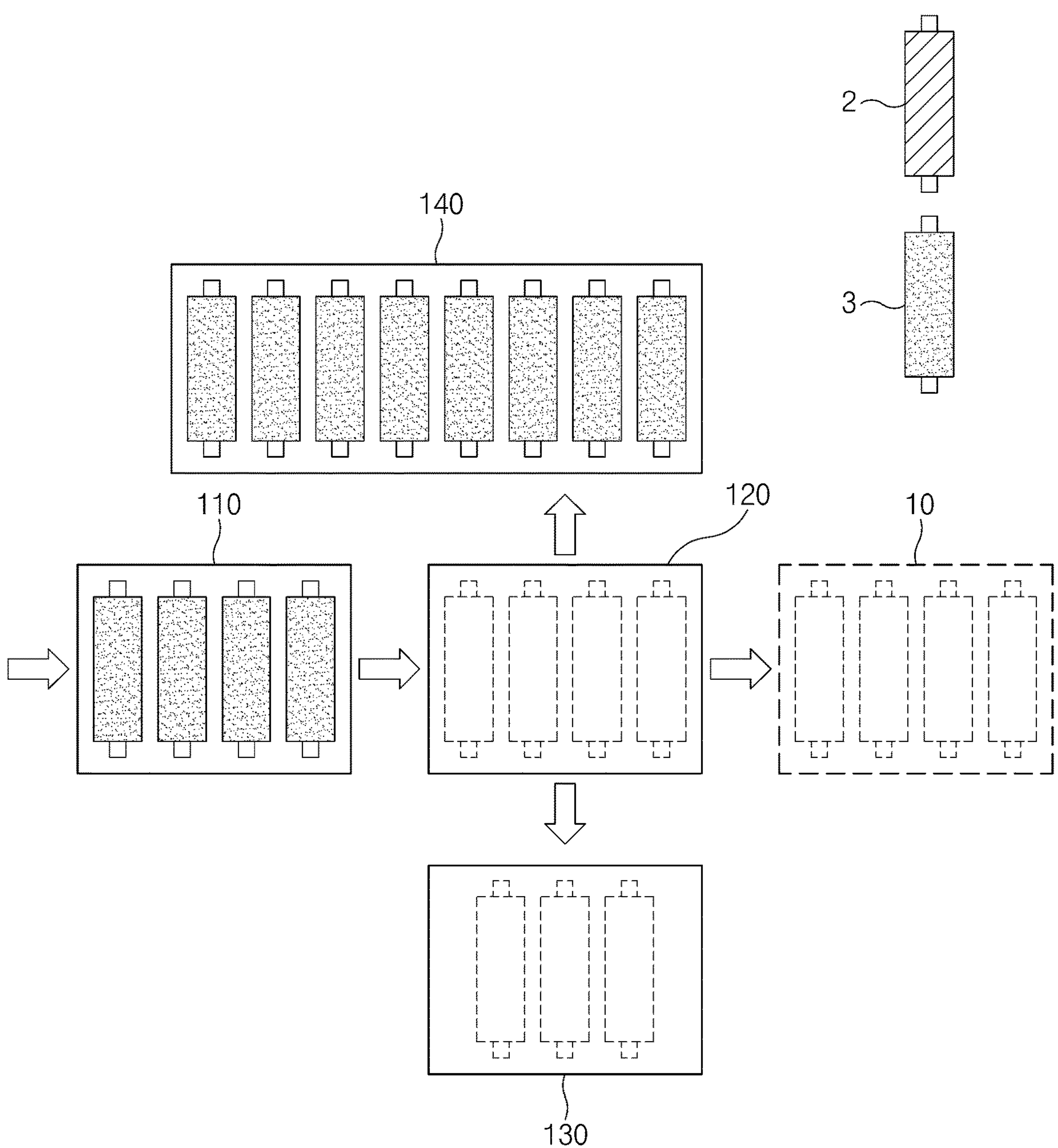
FIG. 7 is a diagram showing inspection and separation of secondary batteries according to a fifth embodiment of the present disclosure.

FIG. 7 shows inspection and separation of secondary batteries according to a fifth embodiment of the present disclosure.

When there is no good battery 2 and there are four defective batteries 3, among the four batteries included in the supplied battery group, the battery inspection unit 110 may determine that, among the four batteries, there is no good battery 2 and there are four defective batteries 3.

When identifying the determination made, the battery separation unit 120 may identify whether it is possible to form the good battery group 10 by receiving a good battery 2 from the good battery storage unit 130 by transfer. In this case, since no good battery 2 exists in the good battery storage unit 130 according to the fourth embodiment, it may not be possible to form the good battery group 10 including four good batteries by receiving zero good batteries 2 by transfer.

The battery separation unit 120 may identify that the formation of the good battery group 10 is not possible, and may transfer the four defective batteries 3 to the defective battery storage unit 140. The battery separation unit 120 may not discharge the good battery group 10.

In this case, no good battery 2 may exist in the good battery storage unit 130 and eight defective batteries 3 may exist in the defective battery storage unit 140.

Figure 8:
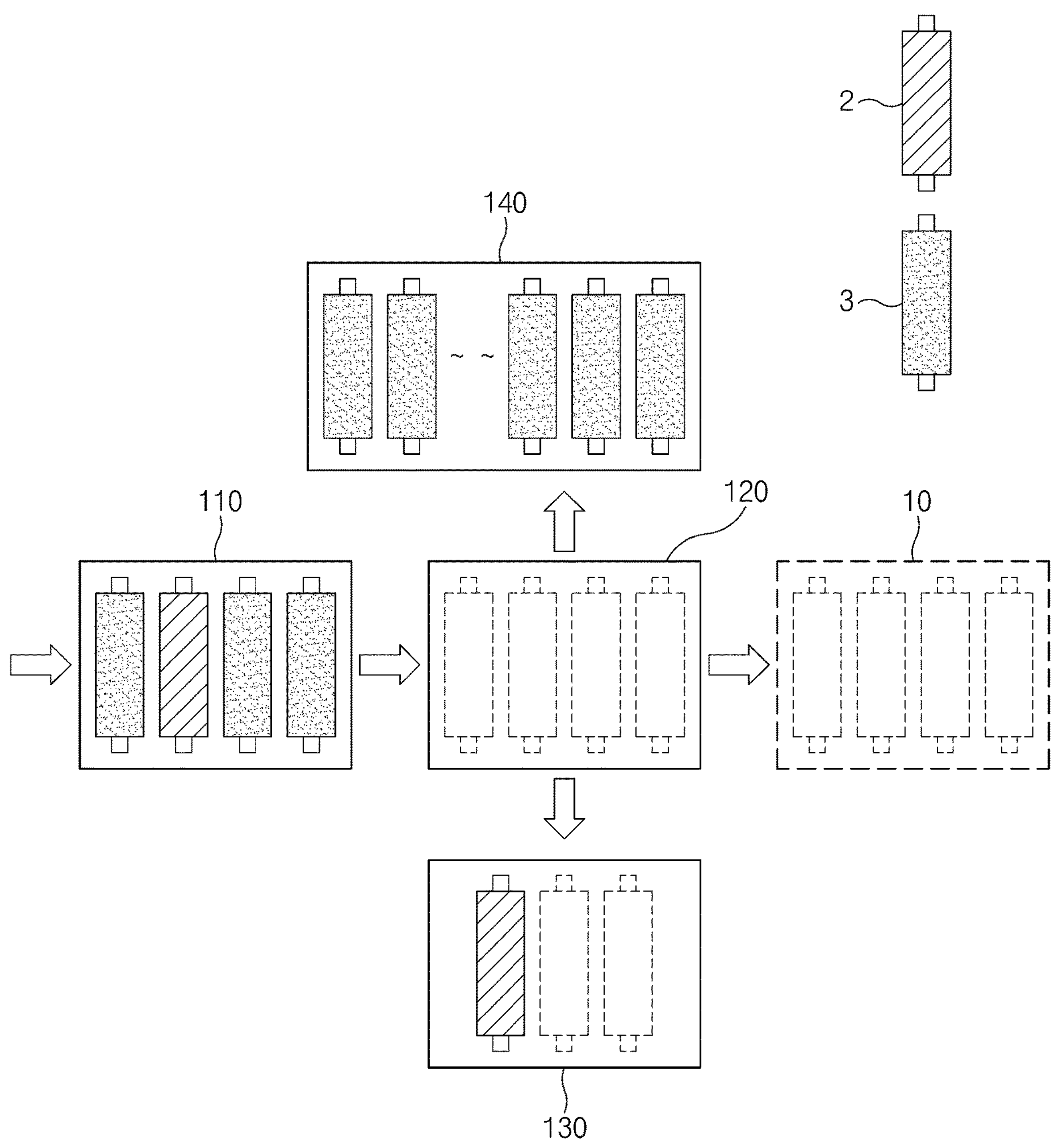
FIG. 8 is a diagram showing inspection and separation of secondary batteries according to a sixth embodiment of the present disclosure.

FIG. 8 shows inspection and separation of secondary batteries according to a sixth embodiment of the present disclosure.

When there is one good battery 2 and three defective batteries 3, among the four batteries included in the supplied battery group, the battery inspection unit 110 may determine that, among the four batteries, there is one good battery and there are three defective batteries 3.

When identifying the determination made, the battery separation unit 120 may identify whether it is possible to form the good battery group 10 by receiving a good battery 2 from the good battery storage unit 130 by transfer. In this case, since no good battery 2 exists in the good battery storage unit 130 according to the fifth embodiment, it may not be possible to form the good battery group 10 including four good batteries by receiving a good battery 2 by transfer.

The battery separation unit 120 may identify that formation of the good battery group 10 is not possible, transfer the three defective batteries 3 to the defective battery storage unit 140, and transfer the one good battery 2 to the good battery storage unit 130. The battery separation unit 120 may not discharge the good battery group 10.

In this case, one good battery 2 may exist in the good battery storage unit 130 and eleven defective batteries 3 may exist in the defective battery storage unit 140.

Figure 9:
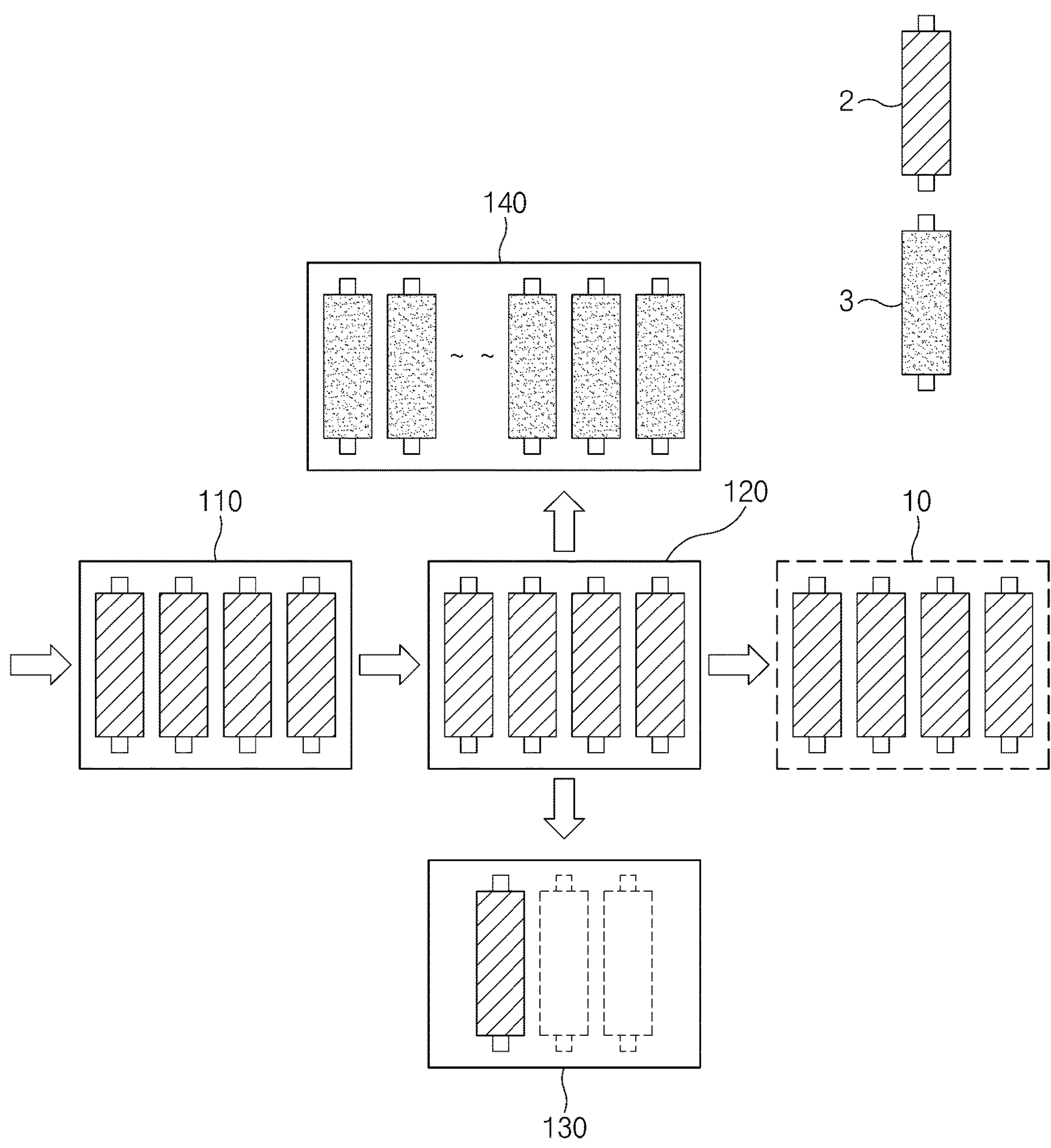
FIG. 9 is a diagram showing inspection and separation of secondary batteries according to a seventh embodiment of the present disclosure.

FIG. 9 shows inspection and separation of secondary batteries according to a seventh embodiment of the present disclosure.

When there are four good batteries 2 and there is no defective battery 3, among the four batteries included in the supplied battery group, the battery inspection unit 110 may determine that, among the four batteries, there are four good batteries and there is no defective battery 3.

When the determination is identified that the four batteries included in the supplied battery group are all good batteries 2, the battery separation unit 120 may discharge all of the four batteries as the good battery group 10.

In this case, one good battery 2 may exist in the good battery storage unit 130 and eleven defective batteries 3 may exist in the defective battery storage unit 140.

Figure 10:
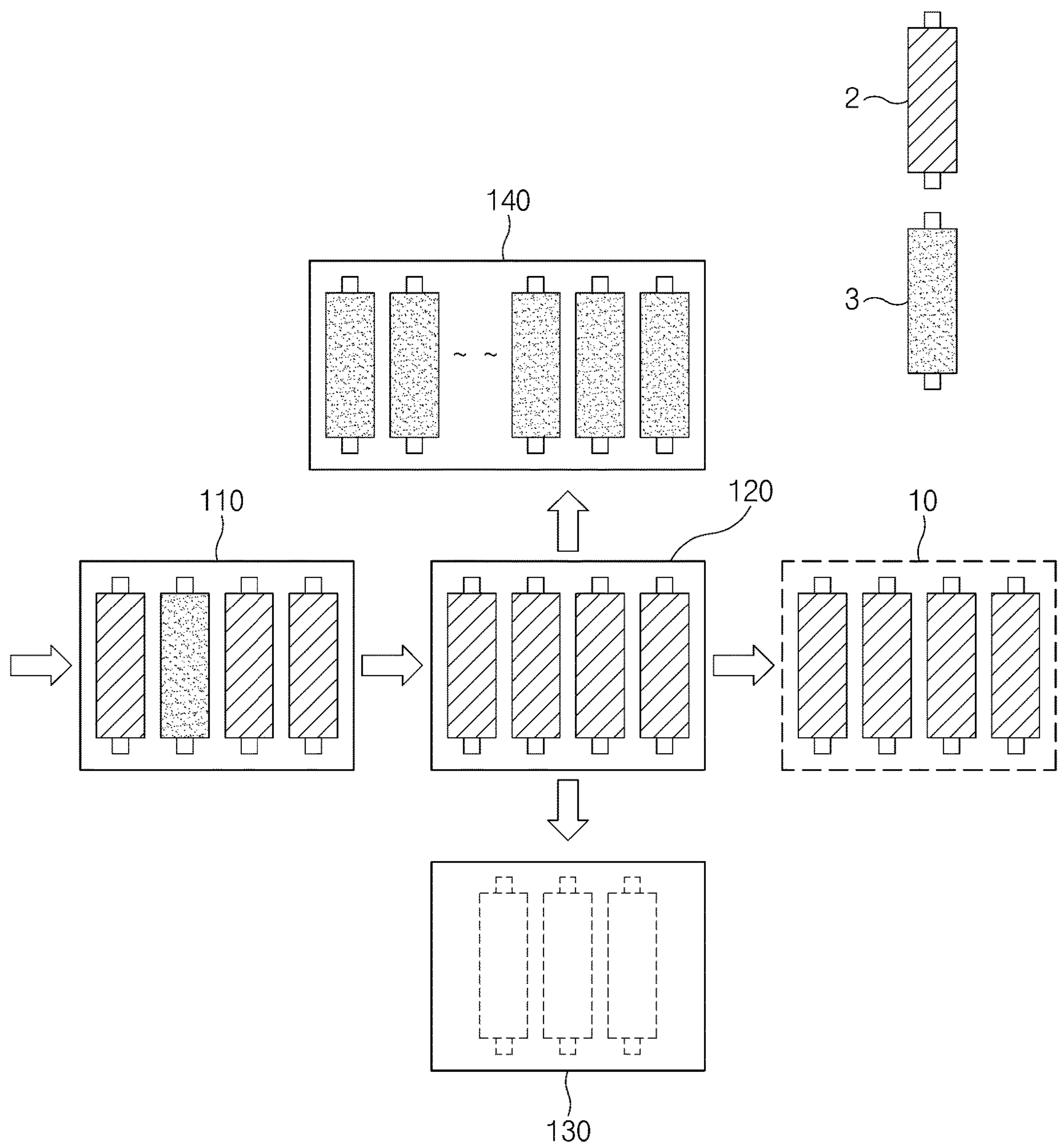
FIG. 10 is a diagram showing inspection and separation of secondary batteries according to an eighth embodiment of the present disclosure.

FIG. 10 shows inspection and separation of secondary batteries according to an eighth embodiment of the present disclosure.

When there are three good batteries 2 and there is one defective battery 3, among the four batteries included in the supplied battery group, the battery inspection unit 110 may determine that, among the four batteries, there are three good batteries and there is one defective battery 3.

When identifying the determination made, the battery separation unit 120 may identify whether it is possible to form the good battery group 10 by receiving a good battery 2 from the good battery storage unit 130 by transfer. In this case, since one good battery 2 exists in the good battery storage unit 130 according to the seventh embodiment, it may be possible to form the good battery group 10 including four good batteries by receiving the good battery 2 by transfer.

The battery separation unit 120 may identify that formation of the good battery group 10 is possible, transfer the one defective battery 3 to the defective battery storage unit 140, and receive the one good battery 2 from the good battery storage unit 130 by transfer. When the battery separation unit 120 receives one good battery 2 by transfer, the good battery group 10 may be formed. The battery separation unit 120 may discharge the good battery group 10 including four good batteries.

In this case, no good battery 2 may exist in the good battery storage unit 130 and twelve defective batteries 3 may exist in the defective battery storage unit 140.

Figure 11:
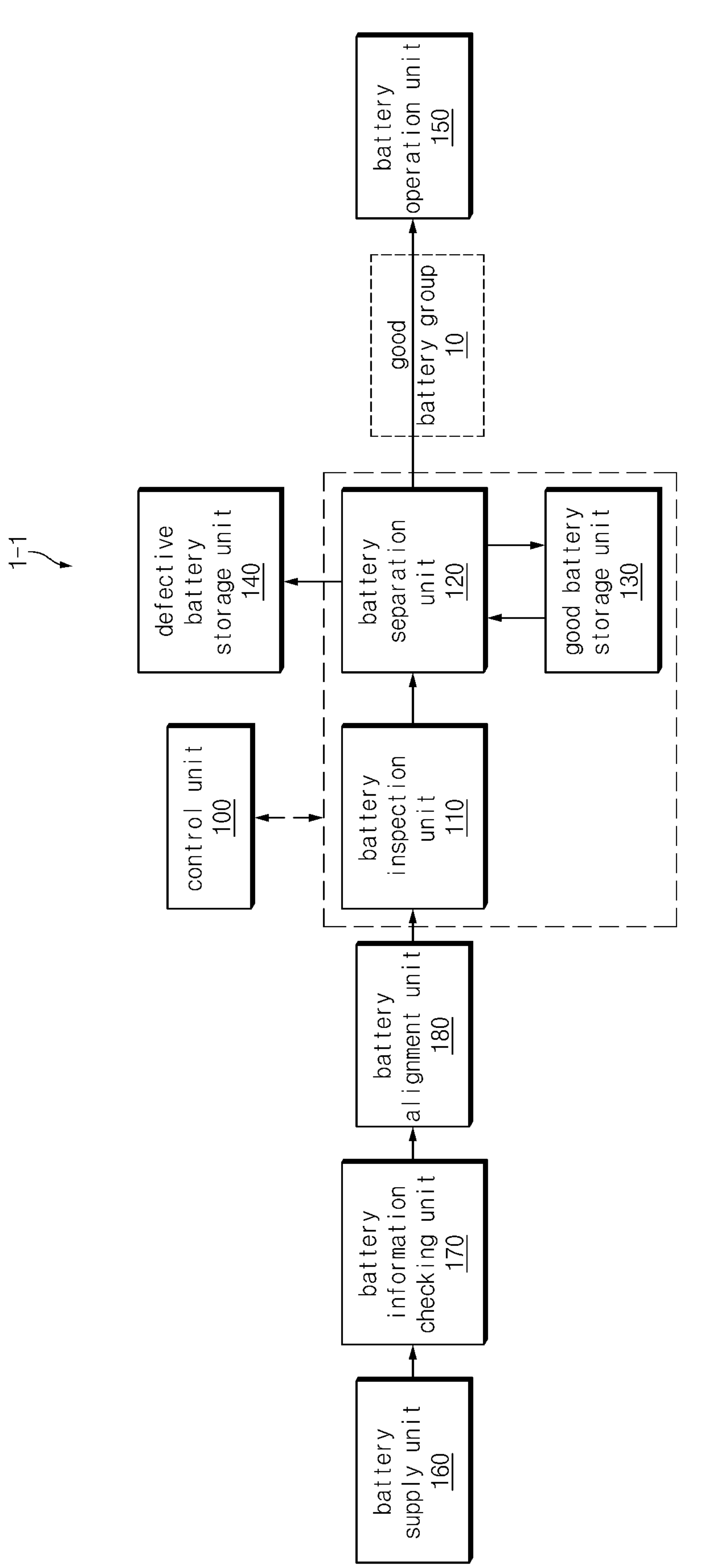
FIG. 11 is a diagram showing a secondary battery manufacturing system including a secondary battery inspection-separation system according to another embodiment of the present disclosure.

FIG. 11 shows a secondary battery manufacturing system 1-1 including a secondary battery inspection-separation system 1 according to another embodiment of the present disclosure.

The secondary battery manufacturing system 1-1 (hereinafter, "manufacturing system 1-1") may include the above-described secondary battery inspection-separation system 1.

The manufacturing system 1-1 may include a battery operation unit 150. The battery operation unit 150 may perform a predetermined operation on the good batteries included in the discharged good battery group 10. For example, the battery operation unit 150 may perform lead cutting on the good batteries included in the good battery group 10. For a specific example, the battery operation unit 150 may identify an alignment state of the good batteries and a position of the lead according to the alignment state through a user interface (e.g., cutting vision), and may perform a predetermined cutting operation based on the identified alignment state and lead position.

The manufacturing system 1-1 may include a battery supply unit 160. The battery supply unit 160 may sequentially supply battery groups each including a predetermined number of batteries to the battery inspection unit 110.

The manufacturing system 1-1 may include a battery information checking unit 170. The battery information checking unit 170 may check battery information about each of a predetermined number of batteries included in the battery groups. For example, when each of a predetermined number of batteries has a barcode including battery information, the battery information checking unit 170 may obtain the battery information by reading the barcode. The battery information may include position information, identification information, and information on whether the battery is good. By the battery information checking unit 170 obtaining battery information, the battery separation unit 120 may perform suction with the suction pad based on position information on each of a predetermined number of batteries that has been identified as good batteries or defective batteries, thereby transferring the identified battery to the good battery storage unit 130 or the defective battery storage unit 140.

The manufacturing system 1-1 may include a battery alignment unit 180. The battery alignment unit 180 may perform mechanical alignment on each battery included in the supplied battery group. For example, before the battery inspection unit 110 performs the inspection, each battery included in the battery group may be aligned so that the inspection may be performed smoothly.

The control unit 100 may be electrically connected to at least one of the battery operation unit 150, the battery supply unit 160, the battery information checking unit 170, and the battery alignment unit 180, and may control operations of at least one of the battery operation unit 150, the battery supply unit 160, the battery information checking unit 170, and the battery alignment unit 180.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

DESCRIPTION OF THE SYMBOLS

1: inspection-separation system
1-1: secondary battery manufacturing system
2: good battery
3: defective battery
10: good battery group
100: control unit
110: battery inspection unit
120: battery separation unit
130: good battery storage unit
140: defective battery storage unit
150: battery operation unit
160: battery supply unit
170: battery information checking unit
180: battery alignment unit

The invention claimed is:

1. A method for inspecting and separating batteries, the method comprising:
- determining which of a predetermined number of the batteries is a good battery;
- when not all of the predetermined number of the batteries are determined to be good batteries:
- receiving another good battery temporarily stored in a good battery storage by transfer, when it is possible to form a good battery group including only good batteries by receiving the another good battery temporarily stored in the good battery storage by the transfer;
- temporarily storing the good battery among the predetermined number of the batteries by transferring the good battery to the good battery storage, when it is not possible to form the good battery group including only good batteries even by receiving the another good battery temporarily stored in the good battery storage by the transfer; and
- discharging the good battery group when the good battery group is formed,
- wherein a number of the good battery being temporarily stored is always less than the predetermined number to form the good battery group.

2. The method of claim 1, further comprising discharging all of the predetermined number of the batteries when all of the predetermined number of the batteries are determined to be good batteries.

3. The method of claim 1, further comprising transferring a defective battery determined not to be a good battery among the predetermined number of the batteries to a defective battery storage for storage of the defective battery.

4. The method of claim 1, wherein the determining of which of the predetermined number of the batteries is a good battery includes determining thereof based on at least one of a voltage test, a current test, and a resistance test for the predetermined number of the batteries.

5. The method of claim 1, wherein the good battery group includes a same number of good batteries as the predetermined number of the batteries.

6. The method of claim 1, further comprising, prior to the determining of which of the predetermined number of the batteries is a good battery, sequentially receiving battery groups each including the predetermined number of the batteries.

7. The method of claim 1, wherein the transfer is performed by using a suction pad.

8. The method of claim 1, further comprising discharging all of the predetermined number of the batteries or the good battery group to a battery operator to perform a predetermined operation.

9. A system for inspecting and separating batteries, the system comprising:
- a battery inspector that determines which of a predetermined number of the batteries is a good battery;
- a battery separator that separates and discharges the predetermined number of the batteries;
- a good battery storage in which good batteries are temporarily stored; and
- a controller electrically connected to the battery inspector and the battery separator,
- wherein the controller:
- controls the battery inspector to determine which of the predetermined number of the batteries is a good battery; and
- controls the battery separator to:
- when not all of the predetermined number of the batteries are determined to be good batteries,
- receive another good battery temporarily stored in the good battery storage by a transfer, when it is possible to form a good battery group by receiving the another good battery temporarily stored in the good battery storage by the transfer;
- temporarily store a good battery among the predetermined number of the batteries by transferring the good battery to the good battery storage, when it is not possible to form the good battery group including only good batteries even by receiving the another good battery temporarily stored in the good battery storage by the transfer; and
- discharge the good battery group when the good battery group is formed,
- wherein a number of the good battery being temporarily stored is always less than the predetermined number to form the good battery group.

10. The system of claim 9, further comprising a defective battery storage that stores a defective battery,
- wherein the controller controls the battery separator to transfer the defective battery determined not to be a good battery among the predetermined number of the batteries to the defective battery storage.

11. The system of claim 9, wherein the controller controls the battery inspector to determine which of the predetermined number of the batteries is a good battery based on at least one of a voltage test, a current test, and a resistance test for the predetermined number of the batteries.

12. The system of claim 9, wherein the good battery group includes a same number of good batteries as the predetermined number of the batteries.

13. The system of claim 9, wherein the battery separator transfers the good battery using a suction pad.

14. The system of claim 9, further comprising a battery supplier that sequentially supplies battery groups each including the predetermined number of the batteries to the battery inspector.

15. The system of claim 9, further comprising a battery operator that performs a predetermined operation on the discharged all of the predetermined number of the batteries, or the discharged good battery group.

16. The system of claim 9, wherein the controller controls the battery separator to, when all of the predetermined number of the batteries are determined to be good batteries, discharge all of the predetermined number of the batteries.

* * * * *